Patented Feb. 15, 1944

2,341,759

UNITED STATES PATENT OFFICE 2,341,759

METHOD OF DISPERSING PIGMENTS IN POLYAMIDES

Willard E. Catlin, Edgewood, Md., assignor to E. I. du Pont de Nemours & Company, Wilmington, Del., a corporation of Delaware No Drawing. Application May 13, 1942, Serial No. 442,856

9 Claims. (Cl. 260—37)

This invention relates to polymers of the nylon type and more particularly to the production of pigmented synthetic linear polyamides and articles obtained therefrom.

The synthetic polymeric materials used in the practice of this invention are of the general type described in United States Patents 2,071,250, 2,071,253, and 2,130,948. The polymers there described are high molecular weight products which generally can be obtained crystalline in structure as evidenced by X-ray powder diffraction patterns in the massive state. The high molecular weight required for the best fiber-forming properties is obtained by continuing the polymerization until the intrinsic viscosity, defined as given in the above mentioned Patent 2,130,948, is at least 0.4. The polymer can then be cold drawn (that is, drawn under tension in the solid state) with permanent and high linear extension to yield filaments and textile fibers showing by X-ray examination molecular orientation along the fiber axis. The present invention is applicable also to the lower molecular weight polymers incapable of orientation to substantial degree.

The polyamides of this kind, generally speaking, comprise the reaction product of a linear polymer-forming composition containing amide-forming groups, for example, reacting material consisting essentially of bifunctional molecules each containing two reactive groups which are complementary to reactive groups in other molecules and which include complementary amide-forming groups. These polyamides as described above can be obtained by the methods given in the above mentioned patents and by other methods, for example, by self-polymerization of a monoaminomonocarboxyclic acid, by reacting a diamine with a dibasic carboxylic acid in substantially equimolecular amounts, or by reacting a mono aminomonohydric alcohol with a dibasic carboxylic acid in substantially equimolecular amounts, it being understood that reference herein to the amino acids, diamines, dibasic carboxylic acids and amino alcohols is intended to include the equivalent amide-forming derivatives of these reactants. The polyamides are best obtained from these reactants which have a unit length, as defined in the last two patents mentioned above, of at least 7. The average number of carbon atoms separating the amide groups in these polyamides is at least two.

These linear polyamides include also polymers obtained by admixture of other linear polymer-forming reactants, as for instance, glycol-dibasic acid mixtures or hydroxy acids in the case of polyester-amides, with the mentioned polyamide-forming reactants. Both the simple and modified linear polyamides contain the recurring amide groups

in which X is oxygen or sulfur and R is hydrogen or a monovalent hydrocarbon radical as an integral part of the main chain of atoms in the polymer. On hydrolysis with hydrochloric acid the amino acid polymers yield the amino acid hydrochloride, the diamine-dibasic acid polymers yield the diamine hydrochloride and the dibasic carboxylic acid, and the amino alcohol-dibasic acid polymers yield the amino alcohol hydrochloride and the dibasic carboxylic acid.

It is desirable in some instances, for example, in order to impart color to the polyamide products and to deluster textile fibers obtained therefrom, to incorporate pigment into the polymer. In the case of colored articles, it is essential that the pigment be in a highly dispersed and deflocculated form in order that the pigment have its greatest coloring power and produce the highest gloss. In processing polyamide containing a coloring pigment or a delustering pigment, such as titanium dioxide, by extrusion of the pigment-containing polymer in the form of filaments, fibers, and films, there is an added importance of insuring that the pigment is not in an agglomerated or highly flocculated form which causes fouling of filter packs during melt extrusion and roughness in the extruded product.

It has been proposed previously to disperse pigment in the present polyamides by heating the dry, finely divided pigment with the polyamide-forming composition or reactants, for example, with the solid diamine-dibasic acid salt. Under these conditions the factor responsible for pigment flocculation, namely, an aqueous solution of ionized material, is absent because no water is used. To be sure a small amount of water is obtained as a by-product of polymerization but this water does not appear until the polymer is formed, and the presence of the polymer or the high viscosity of the reaction mixture or both retard pigment flocculation. However, when the polyamide is made by the preferred method of heating the polyamide-forming material under pressure in the presence of added water so that the reaction mixture is fluid before polymerization temperatures are reached, large pigment agglomerates are formed and it is not possible in the absence of the further requirements and procedure disclosed herein to obtain satisfactory dispersion of the pigment in the polymer.

This invention has as an object a method for obtaining a dispersion of pigment in polyamide containing the pigment in a more highly deflocculated form than has been obtained hitherto. A further object is the production of polyamide containing finely dispersed pigment by polymerizing the polyamide-forming composition in the presence of the pigment and of added water sufficient to make the reaction mixture fluid before it reaches polyamide-forming temperature. Other objects will appear hereinafter.

The above objects are accomplished through the polymerization of polyamide-forming material in the presence of water, finely divided pigment, and protective colloid by procedure which consists in preparing an aqueous dispersion of pigment which contains a protective colloid and in which the pigment is dispersed to small particle size, then adding the polyamide-forming material or reactants with such additional water as may be necessary to render the mass fluid before polymerizing temperatures are reached, and then heating the mixture under the known polymerizing conditions.

This invention is particularly adapted to the use of ionized polyamide-forming materials, for example, the diamine-dibasic acid salt which presents known advantages in polyamide manufacture, since these materials tend strongly to bring about pigment flocculation when polymerization takes place in aqueous medium. The use of a dispersing agent alone will not overcome the agglomeration of the pigment caused by the polyamide-forming salt during the early part of the heating cycle in the preparation of the polyamide. The use of a dispersing agent in addition to the protective colloid, however, gives the best results in most instances, but is not necessary in the case of all pigments. A protective colloid alone, such as casein, gelatin, polyvinyl alcohol, etc., is often sufficient. Surprisingly the protective colloid and dispersing agent retain their function under the drastic conditions used in making the polymer.

The protective colloid must be added to the pigment dispersion before the polyamide-forming material, for the latter if added before the protective colloid causes flocculation of the pigment. In the best method for carrying out the invention the pigment and a dispersing agent are ground in water until the pigment is dispersed to the desired particle size which will generally be below 4 microns, the protective colloid is added, and then the polyamide-forming material with such additional water as may be needed is added, after which the mixture is polymerized by the procedure of United States Patent 2,163,636.

The protective colloids and dispersing agents useful in the practice of this invention include the various materials of this class known to be useful in preparing dispersions. The preferred protective colloids are the protein salts, and the preferred dispersing agents are substances, such as the sodium salt of beta-naphthalenesulfonic acid-formaldehyde reaction product, the sodium salt of a lignin sulfonic acid, and the polyether resulting from the condensation of hexylphenol and ethylene oxide. These dispersing agents are known under the trade names of "Leukanol," "Daxad," and "Igepal C," respectively.

A valuable embodiment of this invention is the production of nylon products containing carbon black in well dispersed form since insofar as I am aware a good dispersion of carbon black in nylon has not been obtained heretofore. For this purpose both the colloid and a dispersing agent must be used in the procedure described above. A general method for practicing the invention which is applicable to carbon black and other pigments suitable for pigmenting polyamides is as follows:

An aqueous dispersion of the pigment is prepared by ball milling a mixture of water, pigment (usually 10–30% by weight based on the finished dispersion), and dispersing agent (in general 0.5–10% based on weight of pigment), such as the sodium salt of the condensation product of a beta-naphthalenesulfonic acid and formaldehyde. This solution is then diluted with water and an aqueous solution containing 3–15% of ammoniacal casein is added in an amount corresponding to 2–10% of casein based on the weight of pigment. The desired quantity of this pigmented solution is then added to a concentrated aqueous solution of polyamide-forming ingredients, and polymerization of the resulting mixture is carried out in the normal fashion, as described in United States Patent 2,163,636, i. e. by heating the reaction mixture at amide-forming temperatures (about 180° to 300° C.) with retention of water until the major portion of the reactants have combined to form polyamide and then continuing the heating with gradual removal of water as steam until the desired degree of polymerization is attained.

This invention is described more specifically in the following examples in which proportions are expressed as parts by weight.

*Example I*

An aqueous dispersion of carbon black was prepared by ball milling for 24 hours the following constituents: Ten parts of General Atlas Carbon's "Gastex" carbon black, 40 parts of water, and 1 part of "Leukanol" ("Leukanol" is a commercial dispersing solution containing approximately 70 parts of water to 30 parts of the sodium salt of the condensation product of a beta-naphthalensulfonic acid with formaldehyde). After diluting the dispersion with 800 parts of water, a solution containing 0.5 part of casein, 50 parts of water, and 1 part of concentrated ammonium hydroxide was added. The resulting dispersion of "protected" pigment was then added to 3300 parts of hexamethylenediammonium adipate dissolved in 800 parts of water containing 7.5 parts of acetic acid as viscosity stabilizer. This mixture was carried through the usual polymerization cycle, as described in United States Patent 2,163,636, and then extruded in the form of a monofil. The resulting filament was smooth and glossy black, and had good cold drawing characteristics. Microscopic examination of the monofil indicated the carbon black to be well dispersed and in a highly deflocculated form. Some pigment agglomerates were detected but the largest of these were about 3–4 microns in diameter.

*Example II*

A solution of 1 part of casein, 0.2 part of concentrated ammonium hydroxide, and 5.7 parts of water was mixed with 10 parts of a self-dispersible grade of titanium dioxide containing on its surface potassium and sodium salts of phosphates, pyrophosphates, silicates and titanates which function as dispersing agents. After the addition of a solution of 40 parts of hexamethylenediammonium adipate and 45 parts of water, this mixture was passed through a disper-mill. The aqueous dispersion obtained in this manner was then added to a solution of 3800 parts of hexamethylenediammonium adipate and 4300 parts of water, and the resulting mixture was carried through the normal polymerization cycle and spun into filament form. The pigment in the filaments was found to be in a well dispersed and deflocculated form.

Although water dispersible pigments and water dispersing agents in general may be used in this invention certain pigment-dispersing agent combinations give better results than others. With carbon black pigments the commercial dispersing agents such as "Leukanol," "Daxad," and "Igepal C" have given the best results. With the self-dispersible type pigments, such as certain specially prepared grades of titanium dioxide, no dispersing agent is needed.

In selecting the colloid to be used in conjunction with a dispersing agent, an alkaline colloid such as ammoniacal casein or ammoniacal gelatin should be used when an alkaline dispersing agent such as "Leukanol" is used. In the same manner, if an acid dispersing agent is used for dispersing the pigment, an acid colloid should be used. For example, gum Arabic is used rather than an ammoniacal gelatin as a protective colloid in polyamide-forming ingredients-pigment systems containing tannic acid as the dispersing agent. Similarly, ammoniacal casein is used rather than gum Arabic as the protective colloid in systems containing "Leukanol," or "Daxad" as the dispersing agent for the pigment.

In the practice of this invention as described by the examples, few particles are found in the finally processed polyamide as large as 2 to 4 microns. In general it is undesirable to have few, if any, pigment particles larger than 6 to 8 microns in a polyamide to be extruded in the form of a filament, fiber, ribbon, etc. This, however, is a relative matter and larger particle sizes can be tolerated depending on the size of the filament, thickness of the film, etc.

The pigmented polyamides of this invention are useful for a variety of purposes, as for example, in the form of filaments, for paint-, hair-, and toothbrushes, fishing leaders, etc., and in the form of a polyamide molding powder, films, and as fibers for use in making nylon knitted goods, fabrics, cords, etc. The pigmented polyamides are also useful as coating compositions for fabrics, wires, wood, paper, etc.

As many apparently widely different embodiments of this invention may be made without departing from the spirit and scope thereof, it is to be understood that I do not limit myself to the specific embodiments thereof except as defined in the appended claims.

I claim:

1. A process for preparing pigmented polyamides which comprises mixing polyamide-forming material with a dispersion of pigment in an aqueous liquid system containing a protective colloid, and then heating the mixture to polymerize said polyamide-forming material, said polyamide-forming material being selected from the group consisting of monoaminomonocarboxylic acids, mixtures of dibasic carboxylic acid with diamine, and mixtures of dibasic carboxylic acid with monoaminomonohydric alcohol.

2. A process for preparing pigmented polyamides which comprises mixing polyamide-forming material with a dispersion of pigment in an aqueous liquid system containing a protective colloid and a dispersing agent, and then heating the mixture to polymerize said polyamide-forming material, said polyamide-forming material being selected from the group consisting of monoaminomonocarboxylic acids, mixtures of dibasic carboxylic acid with diamine, and mixtures of dibasic carboxylic acid with monoaminomonohydric alcohol.

3. A process for preparing pigmented polyamides which comprises grinding pigment and a dispersing agent in water until the pigment is dispersed to a particle size below 4 microns, adding a protective colloid to the dispersion, mixing the protected dispersion with a polyamide-forming material and then heating the mixture to polymerize said polyamide-forming material, said polyamide-forming material being selected from the group consisting of monoaminomonocarboxylic acids, mixtures of dibasic carboxylic acid with diamine, and mixtures of dibasic carboxylic acid with monoaminomonohydric alcohol.

4. The process set forth in claim 1 in which said polyamide-forming material is the salt of a diamine and a dicarboxylic acid.

5. The process set forth in claim 1 in which said polyamide-forming material is hexamethylenediammonium adipate.

6. The process set forth in claim 1 in which said pigment is carbon black.

7. The process set forth in claim 2 in which said pigment is carbon black.

8. The process set forth in claim 2 in which said polyamide-forming material is the salt of a diamine and a dicarboxylic acid.

9. The process set forth in claim 2 in which said polyamide-forming material is the salt of a diamine and a dicarboxylic acid, and in which said pigment is carbon black.

WILLARD E. CATLIN.